(12) United States Patent
Nakai et al.

(10) Patent No.: US 9,550,674 B2
(45) Date of Patent: Jan. 24, 2017

(54) PLANT FOR MANUFACTURING HYDROGEN SULFIDE GAS AND METHOD FOR EXHAUSTING HYDROGEN SULFIDE GAS

(71) Applicant: SUMITOMO METAL MINING CO., LTD., Tokyo (JP)

(72) Inventors: Osamu Nakai, Tokyo (JP); Satoshi Matsubara, Tokyo (JP); Tomoyuki Hirose, Tokyo (JP); Koichi Nakagawa, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/767,200

(22) PCT Filed: Dec. 10, 2013

(86) PCT No.: PCT/JP2013/083091
§ 371 (c)(1),
(2) Date: Aug. 11, 2015

(87) PCT Pub. No.: WO2014/125712
PCT Pub. Date: Aug. 21, 2014

(65) Prior Publication Data
US 2016/0002038 A1    Jan. 7, 2016

(30) Foreign Application Priority Data

Feb. 13, 2013  (JP) ................................ 2013-025398

(51) Int. Cl.
*C01B 17/16*     (2006.01)
*B01D 53/52*     (2006.01)
(Continued)

(52) U.S. Cl.
CPC ............. *C01B 17/162* (2013.01); *B01D 53/52* (2013.01); *B01J 19/0006* (2013.01); *B01J 19/24* (2013.01);
(Continued)

(58) Field of Classification Search
None
See application file for complete search history.

(56) References Cited

U.S. PATENT DOCUMENTS 4,478,811 A    10/1984 Hass
4,861,576 A    8/1989 Stegelman
(Continued)

FOREIGN PATENT DOCUMENTS

JP    S49-43447 A    4/1974
JP    2005-205346 A  8/2005
(Continued)

OTHER PUBLICATIONS

Jan. 28, 2014 International Search Report issued in Application No. PCT/JP2013/083091.
Oct. 11, 2016 Extended European Search Report issued in European Application No. 13874981.7.

*Primary Examiner* — Melvin C Mayes
*Assistant Examiner* — Sheng H Davis
(74) *Attorney, Agent, or Firm* — Oliff PLC

(57) ABSTRACT

An object of the present invention is to reduce costs while maintaining safety in exhausting hydrogen sulfide gas. In exhaust facilities of a plant for manufacturing hydrogen sulfide gas, the concentrations of hydrogen sulfide gas leaking from a reaction facility, a cooling facility, and a sulfur removal facility, respectively, are measured by a measuring apparatus, and when a detected concentration is less than a predetermined concentration, a valve is controlled to exhaust hydrogen sulfide gas from a first exhaust pipe into the air, on the contrary, when a detected concen-
(Continued)

tration is not less than a predetermined concentration, the valve is controlled to exhaust hydrogen sulfide gas from a second exhaust pipe to a gas treatment facility.

12 Claims, 4 Drawing Sheets

(51) Int. Cl.
  *B01J 19/00* (2006.01)
  *B01J 19/24* (2006.01)
(52) U.S. Cl.
  CPC ......... *C01B 17/16* (2013.01); *B01D 2251/304* (2013.01); *B01J 2219/00164* (2013.01); *B01J 2219/00245* (2013.01)

(56) References Cited

U.S. PATENT DOCUMENTS

| 2009/0242379 A1 | 10/2009 | Tokumasu et al. |
| 2009/0317322 A1 | 12/2009 | Wolfert et al. |
| 2010/0008839 A1 | 1/2010 | Wolfert et al. |

FOREIGN PATENT DOCUMENTS

| JP | 2009-234806 A | 10/2009 |
| JP | 2010-030866 A | 2/2010 |
| JP | 2010-515660 A | 5/2010 |
| JP | 2010515658 A | 5/2010 |
| JP | 2010-126778 A | 6/2010 |
| JP | 2013-025398 A | 2/2013 |

PLANT FOR MANUFACTURING HYDROGEN SULFIDE GAS AND METHOD FOR EXHAUSTING HYDROGEN SULFIDE GAS

FIELD OF THE INVENTION

The present invention relates to a plant for manufacturing hydrogen sulfide gas and a method for exhausting hydrogen sulfide gas, and more specifically, relates to a plant for manufacturing hydrogen sulfide gas which is provided with an exhaust facility configured to exhaust leaking hydrogen sulfide gas to the air or a gas treatment facility, and a method for exhausting hydrogen sulfide gas by the plant for manufacturing hydrogen sulfide gas. The present application claims priority based on Japanese Patent Application No. 2013-025398 filed in Japan on Feb. 13, 2013. The total contents of the patent application are to be incorporated by reference into the present application.

BACKGROUND ART

For example, in a hydrometallurgical method for nickel oxide ore, a sulfurization treatment is performed in such a manner that hydrogen sulfide gas is blown into a solution obtained by neutralizing a leach solution of nickel oxide ore or a solution for nickel recovery from which impurities are removed, whereby a metal sulfide is formed.

The hydrogen sulfide gas to be used at this treatment is manufactured, for example, by a plant for manufacturing hydrogen sulfide gas configured to manufacture hydrogen sulfide. The plant for manufacturing hydrogen sulfide gas includes a facility configured to manufacture hydrogen sulfide gas, a facility configured to cool generated hydrogen sulfide gas, a facility configured to recover sulfur contained in the hydrogen sulfide gas, and the like. Such plants for manufacturing hydrogen sulfide are mainly classified into two, namely, plants which use a catalyst as illustrated in FIG. 3 and plants which use no catalyst as illustrated in FIG. 4.

Specifically, a plant for manufacturing hydrogen sulfide gas 50 illustrated in FIG. 3 includes: a reaction facility 51 configured to generate hydrogen sulfide gas from supplied sulfur and supplied hydrogen gas; a cooling facility 52 configured to cool the hydrogen sulfide gas; a washing facility 53 configured to wash sulfur contained in the hydrogen sulfide gas; and a drying facility 54 configured to dry hydrogen sulfide gas after the washing to remove moisture therefrom. Furthermore, the plant for manufacturing hydrogen sulfide gas 50 includes incidental facilities, namely, a storage facility 55 configured to store produced hydrogen sulfide gas and a supply facility 56 configured to supply the hydrogen sulfide gas.

In the plant for manufacturing hydrogen sulfide gas 50, a catalyst is used inside a reactor of the reaction facility 51 in order to reduce activation energy. Furthermore, in the plant for manufacturing hydrogen sulfide gas 50, sulfur contained in manufactured hydrogen sulfide gas is removed by the washing facility 53, and then, moisture is removed by the drying facility 54, whereby the corrosion of facilities due to moisture is prevented.

Furthermore, in the plant for manufacturing hydrogen sulfide gas 50, using the supply facility 56 such as a compressor, the pressure of manufactured hydrogen sulfide gas is increased to a required pressure, and the hydrogen sulfide gas having the increased pressure is supplied to, for example, a plant which uses hydrogen sulfide gas in a dezincification step, a sulfurization step, or the like in the foregoing hydrometallurgical method of nickel oxide ore.

In the plant for manufacturing hydrogen sulfide gas 50, as conditions for manufacturing hydrogen sulfide gas, for example, at a pressure of approximately 5 kPaG and a temperature of approximately 380° C., operations are carried out. In this plant for manufacturing hydrogen sulfide gas 50, a catalyst is used for the reaction facility 51, and therefore, operations can be carried out under low pressures and low temperatures, and this point constitutes an operational advantage.

However, in the plant for manufacturing hydrogen sulfide gas 50, it is necessary to periodically replace a catalyst in the reaction facility 51, and besides, from a viewpoint of the life of a catalyst, it is necessary to strictly control the quality of sulfur, that is, a raw material of hydrogen sulfide gas.

On the other hand, a plant for manufacturing hydrogen sulfide gas 60 illustrated in FIG. 4 is a plant which does not use a catalyst in a reactor. As illustrated in FIG. 4, the plant for manufacturing hydrogen sulfide gas 60 includes: a reaction facility 61 (a reactor 66, a quench tower 67, a heater 68) configured to generate hydrogen sulfide gas from sulfur and hydrogen gas; cooling facilities 62 (62A, 62B) configured to cool the hydrogen sulfide gas; a knockout facility 63 configured to remove sulfur contained in the hydrogen sulfide gas and supply the hydrogen sulfide gas; and a blowdown facility 64 configured to recover the sulfur removed from the hydrogen sulfide gas and supply the sulfur to a sulfur treatment plant or the like. Furthermore, the plant for manufacturing hydrogen sulfide gas 60 includes a facility 65, as an incidental facility, configured to cool the temperature of sulfur to adjust a heat balance.

In the plant for manufacturing hydrogen sulfide gas 60, molten sulfur is stored in the reactor 66 of the reaction facility 61, and hydrogen gas is supplied from the lower portion of the reactor 66, whereby, during hydrogen gas passes the molten sulfur, a formation reaction of hydrogen sulfide gas proceeds. It should be noted that sulfur, which is decreased by the reaction, is supplied from the upper portion of the reaction facility 61. Most of the hydrogen sulfide gas formed in the reaction facility 61 is hydrogen sulfide, but, the hydrogen sulfide gas contains sulfur steam which is caught when hydrogen gas passes through the inside of the reactor.

Furthermore, in the plant for manufacturing hydrogen sulfide gas 60, as conditions for manufacturing hydrogen sulfide gas, for example, under high pressure and temperature, that is, at a pressure of approximately 800 kPaG and a temperature of approximately 470° C., operations are carried out. The temperature of formed hydrogen sulfide gas decreases to approximately 150° C. at the time when the gas leaves the quench tower 67 constituting the reaction facility 61, and furthermore, the gas is cooled to approximately 50° C. (a temperature used in a supply destination facility) by the cooling facility 62, and transported to the knockout facility 63.

Furthermore, a great operational-trouble is caused when most of sulfur contained in hydrogen sulfide gas generated in the reaction facility 61 adheres to valves, such as a control valve and a manual valve, and meters, such as a thermometer and a pressure gauge, in a plant or the like which is a supply destination and uses hydrogen sulfide gas. Therefore, the gas is solidified once by the knockout facility 63, and sulfur deposited on the bottom of the knockout facility 63 is heated by steam via a jacket provided in the lower perimeter of the knockout facility 63, thereby being melted and recovered.

The recovered sulfur is stored in the blowdown facility 64, and then, using a supply pump 69, the sulfur is supplied to a sulfur treatment plant to be processed or repeatedly used.

In this manner, sulfur contained in hydrogen sulfide gas generated in the plant for manufacturing hydrogen sulfide gas 60 is separated from the hydrogen sulfide gas by a knockout drum, and then, the hydrogen sulfide gas is supplied to, for example, a plant which uses hydrogen sulfide gas in a dezincification step, a sulfurization step, or the like in the foregoing hydrometallurgical method of nickel oxide ore.

In the plant for manufacturing hydrogen sulfide gas 60, operations are controlled in a state in which a pressure in a system is maintained high, and therefore, facilities, such as a compressor and a chiller, are unnecessary, whereby an initial investment can be reduced. Furthermore, the plant for manufacturing hydrogen sulfide gas 60 has an advantage that periodic catalyst replacement like the foregoing one performed in the plant for manufacturing hydrogen sulfide gas 50, costs for this replacement, and maintenance costs including the quality control of sulfur are not required, whereby operation costs can be reduced.

However, in the plant for manufacturing hydrogen sulfide gas 60, operations are performed under high pressure and temperature, and therefore, the danger associated with gas leakage is increased.

Since hydrogen sulfide gas is a very hazardous substance, it is necessary to take measures against gas leakage, and for example, it is necessary to enclose a hydrogen sulfide gas manufacturing facility by a building, a shelter, or the like, or to take the direction of wind into consideration.

Hydrogen sulfide gas is usually treated by a detoxifying tower, a scrubber, or a flare facility. In the case of a treatment using a flare facility, hydrogen sulfide gas is burned to generate SOx, and consequently, an environmental problem arises. On the other hand, in the case of a treatment using a detoxifying tower or a scrubber, an environmental problem does not arise, but, a neutralizer such as caustic soda is needed to neutralize hydrogen sulfide gas, and accordingly the cost of a neutralizer is required. A detoxifying facility, a scrubber, and a flare facility are operated even when hydrogen sulfide gas does not leak. Hence, in the case of a detoxifying facility and a scrubber, a neutralizer is additionally required for that operation, thereby leading to higher costs.

In the plant for manufacturing hydrogen sulfide gas 60, it has been desired that, while safety in exhausting hydrogen sulfide gas is maintained, the amount of a neutralizer used is reduced to achieve cost reduction.

PRIOR-ART DOCUMENTS

Patent Document

Patent document 1: Japanese Patent Application Laid-Open No. 2010-126778

SUMMARY OF THE INVENTION

Problems to be Solved by the Invention

In view of such problems, an object of the present invention is to provide a plant for manufacturing hydrogen sulfide gas which makes it possible to achieve cost reduction, for example, cost reduction by reducing the amount of a neutralizer necessary for rendering hydrogen sulfide gas harmless, while maintaining safety in exhausting hydrogen sulfide gas, and to provide a method for exhausting hydrogen sulfide gas by the plant for manufacturing hydrogen sulfide gas.

Means to Solve the Problems

The present inventors earnestly studied to achieve the foregoing object, and as a result, a plant for manufacturing hydrogen sulfide gas according to the present invention includes, at least: a reaction facility configured to generate hydrogen sulfide gas from sulfur and hydrogen gas; a cooling facility configured to cool generated hydrogen sulfide gas; a sulfur removal facility configured to remove sulfur contained in the hydrogen sulfide gas; and a gas treatment facility configured to render the hydrogen sulfide gas harmless, and the plant has exhaust facilities which are provided in the reaction facility, the cooling facility, and the sulfur removal facility, respectively, and configured to exhaust hydrogen sulfide gas leaking from the facilities. Each of the exhaust facilities is characterized by including: an exhaust pipe whose one end branches out into a first exhaust pipe configured to exhaust leaking hydrogen sulfide gas to the air and a second exhaust pipe configured to exhaust leaking hydrogen sulfide gas to the gas treatment facility; a concentration measuring apparatus provided between the corresponding facility and a branch point in the exhaust pipe and configured to measure the concentration of hydrogen sulfide gas; and a valve mechanism configured to perform control in such a manner that, when the concentration measuring apparatus detects a concentration less than a predetermined concentration, hydrogen sulfide gas is exhausted from the first exhaust pipe to the air, and when the concentration measuring apparatus detects a concentration not less than a predetermined concentration, hydrogen sulfide gas is exhausted from the second exhaust pipe to the gas treatment facility.

Furthermore, the exhaust method by the plant for manufacturing hydrogen sulfide gas according to the present invention is characterized in that, in the plant for manufacturing hydrogen sulfide gas, the valve mechanism is controlled based on a concentration detected by the concentration measuring apparatus to exhaust hydrogen sulfide gas from the first exhaust pipe into the air, or to exhaust the hydrogen sulfide gas from the second exhaust pipe to the gas treatment facility.

Effects of the Invention

According to the present invention, in the plant for manufacturing hydrogen sulfide gas, it is determined from the concentration of leaking hydrogen sulfide gas whether or not hydrogen sulfide gas leaking from each of the facilities needs to be treated by the gas treatment facility, and as a result, in the case where no treatment is required, the gas is exhausted into the air, whereby the operation of the gas treatment facility can be reduced. Thus, in the present invention, the gas treatment facility does not always have to be operated, and accordingly, while safety in exhausting hydrogen sulfide gas is maintained, for example, the amount of a neutralizer used in the gas treatment facility can be reduced, whereby cost reduction can be achieved.

DETAILED DESCRIPTION OF THE INVENTION

Figure 1:
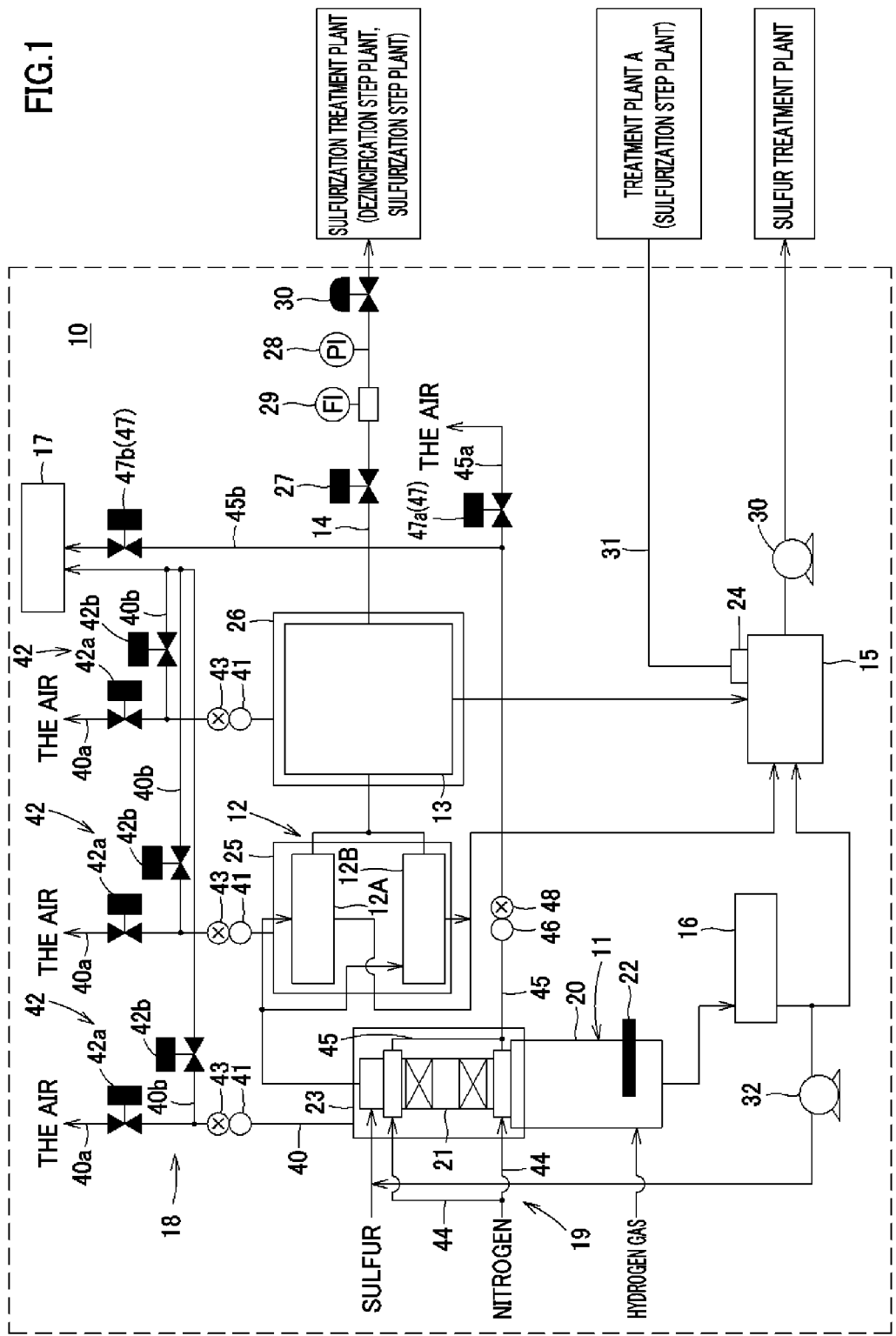
FIG. 1 is a schematic diagram illustrating an example of the configuration of a plant for manufacturing hydrogen sulfide gas adopting the present invention.

Hereinafter, a plant for manufacturing hydrogen sulfide gas and a method for exhausting hydrogen sulfide gas according to the present invention will be described in detail in the following order. It should be noted that the present invention is not limited to the following embodiment, and various changes can be made within the scope not deviating from the gist of the present invention.

1. Outline of the present invention
2. Plant for manufacturing hydrogen sulfide gas
3. Method for exhausting hydrogen sulfide gas

[1. Outline of the Present Invention]

The plant for manufacturing hydrogen sulfide gas according to the present invention includes, at least: a reaction facility configured to generate hydrogen sulfide gas from sulfur and hydrogen gas; a cooling facility configured to cool generated hydrogen sulfide gas; a sulfur removal facility configured to remove sulfur contained in the hydrogen sulfide gas; a gas treatment facility configured to render the hydrogen sulfide gas harmless; and exhaust facilities configured to exhaust hydrogen sulfide gas leaking from the respective facilities other than the gas treatment facility to the air or the gas treatment facility.

In this plant for manufacturing hydrogen sulfide gas, operations are performed under high temperature and pressure, and therefore, hydrogen sulfide gas sometimes leaks out. In this plant for manufacturing hydrogen sulfide gas, in the case of gas leakage, it is determined whether or not leaking hydrogen sulfide gas needs to be rendered harmless, and only in the case where the hydrogen sulfide gas needs to be rendered harmless, the hydrogen sulfide gas is treated by the gas treatment facility, on the contrary, in the case where no treatment is required, that is, in the case where the exhaust of hydrogen sulfide gas into the air has no adverse effect on the environment or humans, the hydrogen sulfide gas is exhausted into the air, whereby the operation of the gas treatment facility can be reduced.

Furthermore, in the plant for manufacturing hydrogen sulfide gas, to avoid the explosion limit of hydrogen sulfide gas in a facility with severe operating conditions such as a reaction facility, sometimes nitrogen gas is flowed into a portion such as a flange portion from which hydrogen sulfide gas easily leaks, whereby leaking hydrogen sulfide gas is removed. Furthermore, at the time of a predetermined periodic inspection, trouble occurrence, or plant start-up, a treatment needs to be performed in such a manner that hydrogen sulfide gas remaining in the plant is substituted by nitrogen gas.

Therefore, the plant for manufacturing hydrogen sulfide gas is sometimes provided with a nitrogen gas supply facility configured to supply nitrogen gas to the reaction facility and the like. In the plant for manufacturing hydrogen sulfide gas, by nitrogen gas which is forced to pass through the inside of a facility, hydrogen sulfide gas is removed from the reaction facility or the like together with the nitrogen gas. As is the case with the exhaust facility, also in the nitrogen gas supply facility, it is determined whether or not removed hydrogen sulfide gas needs to be rendered harmless, and only in the case where the hydrogen sulfide gas needs to be rendered harmless, the hydrogen sulfide gas is treated by the gas treatment facility, on the other hand, in the case where no treatment is required, that is, in the case where the exhaust of hydrogen sulfide gas into the air has no adverse effect on the environment or humans, the hydrogen sulfide gas is exhausted into the air, whereby the operation of the gas treatment facility can be reduced.

[2. Plant for Manufacturing Hydrogen Sulfide Gas]

FIG. 1 is a schematic diagram illustrating an example of the configuration of a plant for manufacturing hydrogen sulfide gas 10. The plant for manufacturing hydrogen sulfide gas 10 illustrated in this FIG. 1 includes: a reaction facility 11 configured to generate hydrogen sulfide gas; a plurality of cooling facilities 12 configured to cool generated hydrogen sulfide gas; a sulfur removal facility 13 configured to remove sulfur contained in the hydrogen sulfide gas and supply hydrogen sulfide gas from which sulfur is removed. Furthermore, the plant for manufacturing hydrogen sulfide gas 10 includes a supply pipe 14 configured to supply a sulfurization treatment plant with hydrogen sulfide gas from which sulfur is removed in the sulfur removal facility 13.

Furthermore, the plant for manufacturing hydrogen sulfide gas 10 includes: a blowdown facility 15 configured to recover and store sulfur which is removed in the sulfur removal facility 13 and to supply the sulfur to a facility for sulfur treatment; and a sulfur cooling facility 16 configured to cool sulfur to adjust a heat balance in the reaction facility 11.

The plant for manufacturing hydrogen sulfide gas 10 further includes: a gas treatment facility 17 configured to render hydrogen sulfide gas leaking from, for example, the reaction facility 11, the cooling facility 12, and the sulfur removal facility 13 harmless; and exhaust facilities 18 configured to exhaust hydrogen sulfide gas leaking from the reaction facility 11, the cooling facility 12, and the sulfur removal facility 13, respectively, to the air or the gas treatment facility 17.

Furthermore, the plant for manufacturing hydrogen sulfide gas 10 may comprise a nitrogen gas supply facility 19 configured to supply nitrogen gas to the reaction facility 11 and the like.

First, each of the facilities will be described.

(Reaction Facility)

The reaction facility 11 includes, for example, a reactor 20, a quench tower 21, a heater 22, and a building 23. The reaction facility 11 causes a hydrogen sulfide gas formation reaction by using supplied sulfur and supplied hydrogen gas to generate hydrogen sulfide gas. More specifically, molten sulfur is stored in the reactor 20, and hydrogen gas is supplied from the lower portion of the reactor 20, whereby, during an upward flow of hydrogen gas passes through the molten sulfur to generate hydrogen sulfide gas, the reaction proceeds. Most of the hydrogen sulfide gas generated here is hydrogen sulfide, but, the gas partially contains sulfur steam which is caught when hydrogen gas passes through the inside of the reactor 20.

Furthermore, in the reaction facility 11, operations are performed under relatively high temperature and high pressure conditions, namely, at a temperature of approximately 470° C. and a pressure of approximately 800 kPaG, and generated hydrogen sulfide gas also has a high temperature and a high pressure, accordingly. It should be noted that a heat exchange is carried out between hydrogen sulfide gas generated in the reaction facility 11 and supplied sulfur, and as a result, the temperature of the hydrogen sulfide gas is approximately 150° C. at the time when the gas passes through the quench tower 21.

In the reaction facility 11, since operations are performed under high temperature and high pressure conditions, a part of generated hydrogen sulfide gas sometimes leaks from the reactor 20 and the quench tower 21. In the reaction facility 11, the reactor 20, the quench tower 21, and the like are enclosed by the building 23, whereby, if a part of hydrogen sulfide gas leaks out, the gas is not directly exhausted into the air and remains inside the building 23. Hydrogen sulfide gas remaining in the building 23 is exhausted by the later-mentioned exhaust facility 18.

(Cooling Facility)

The cooling facility 12 is configured to recover hydrogen sulfide gas generated in the reaction facility 11. A temperature to which hydrogen sulfide gas is cooled in the cooling facility 12 is not particularly limited, but, from a viewpoint of a reduction in the sulfur content of hydrogen sulfide gas, the temperature is preferably lower. Specifically, since (cooling) water is usually used, hydrogen sulfide gas is cooled to approximately 50° C.

In addition, the plant for manufacturing hydrogen sulfide gas 10 is provided with a plurality of the cooling facilities 12. In the cooling facilities 12, a part of sulfur contained in recovered hydrogen sulfide gas is solidified and adheres to the inside of the facilities (a heat transfer surface). Therefore, the provision of a plurality of the cooling facilities 12 allows the cooling facilities 12 to be used by turns, whereby a decrease in operating efficiency associated with a decrease in cooling performance is prevented. It should be noted that the plant for manufacturing hydrogen sulfide gas 10 illustrated in FIG. 1 is an example in which there are two lines, namely the cooling facilities 12A and 12B.

Furthermore, in each of the cooling facilities 12A and 12B, for example, a jacket is provided around the lower circumference of the facility, and heating of the jacket by steam allows the adhering sulfur to be melted. In the cooling facilities 12A and 12B, for example, in the case where sulfur adheres to the inside of the cooling facility 12A, use of the cooling facility 12A is stopped and switched to use of the cooling facility 12B. In the cooling facility 12A which stops being used, sulfur which adheres to the facility by steam is melted and recovered.

Here, even when temporarily stop being used, the cooling facilities 12A and 12B cool hydrogen sulfide gas until just before the use of the facilities is stopped, and therefore, hydrogen sulfide gas of high pressure and high concentration is maintained inside the facilities. Therefore, a treatment of melting and recovering sulfur which adheres to the inside needs to be performed in a state in which hydrogen sulfide gas inside the cooling facilities 12A and 12B which melt and recover the sulfur is exhausted and an internal pressure thereof is reduced. In the plant for manufacturing hydrogen sulfide gas 10, hydrogen sulfide gas exhausted at this time is, what is called, waste hydrogen sulfide gas, and generates in the cooling facilities 12A and 12B.

An aspect of exhausting waste hydrogen sulfide gas from the plant for manufacturing hydrogen sulfide gas 10 is, for example, such that, together with sulfur melted and recovered in the cooling facilities 12A and 12B, waste hydrogen sulfide gas is discharged to the later-mentioned blowdown facility 15 to release a pressure, and is exhausted from an outlet 24 provided in the blowdown facility 15. Alternatively, waste hydrogen sulfide gas generated in the cooling facilities 12A and 12B may be exhausted directly from outlets provided in the cooling facilities 12A and 12B.

It should be noted that, in the case where waste hydrogen sulfide gas is exhausted from the outlet 24 provided in the blowdown facility 15, as illustrated in FIG. 1, later-mentioned piping 31 is arranged so that the outlet 24 of the blowdown facility 15 is connected to a treatment plant A which uses hydrogen sulfide gas. Alternatively, in the case where waste hydrogen sulfide gas is exhausted directly from the outlets provided in the cooling facilities 12A and 12B, later-mentioned piping 31 may be arranged so that the outlets of the cooling facilities 12A and 12B are connected to the treatment plant A which uses hydrogen sulfide gas.

In addition, the cooling facilities 12A and 12B are provided inside a building 25. In the cooling facilities 12A and 12B, hydrogen sulfide gas of high pressure and high concentration is maintained, and therefore, hydrogen sulfide gas sometimes leaks out. The cooling facilities 12A and 12B are enclosed by the building 25, whereby, even if a part of hydrogen sulfide gas leaks out, the gas is not exhausted directly into the air and remains in the building 25. In the case where waste hydrogen sulfide gas is exhausted directly from the outlets, waste hydrogen sulfide gas may be exhausted inside the building 25. Hydrogen sulfide gas and waste hydrogen sulfide gas which have accumulated in this building 25 are exhausted from the building 25 by the later-mentioned exhaust facility 18.

(Sulfur Removal Facility)

The sulfur removal facility (knockout facility) 13 is configured to remove sulfur which has been mixed in hydrogen sulfide gas cooled by the cooling facilities 12A and 12B. Furthermore, the sulfur removal facility 13 is configured to supply hydrogen sulfide gas from which sulfur has been removed to a sulfurization treatment plant or the like which uses hydrogen sulfide gas.

Hydrogen sulfide gas generated inside the reaction facility 11 partially contains sulfur steam. In the sulfur removal facility 13, the sulfur steam is solidified and deposited on the bottom portion of the facility, and for example, is heated by steam via a jacket provided around the lower and outer circumference of the facility, thereby being melted and recovered. The recovered sulfur is transported to the later-mentioned blowdown facility 15.

It should be noted that the sulfurization treatment plant to which the sulfur removal facility 13 supplies hydrogen sulfide gas may be the same as or different from the treatment plant A to which waste hydrogen sulfide gas is supplied via the later-mentioned piping 31. Examples of the sulfurization treatment plant include a plant for a dezincification step and a plant for a sulfurization step which are used in the hydrometallurgical method of nickel oxide ore.

The sulfur removal facility 13 is provided in a building 26 so as to be prepared for hydrogen sulfide gas leakage. The sulfur removal facility 13 is enclosed by the building 26, whereby, even if a part of hydrogen sulfide gas leaks out, the gas is not exhausted directly into the air and remains inside the building 26. Hydrogen sulfide gas having accumulated inside this building 26 is exhausted from the building 26 by the later-mentioned exhaust facility 18.

(Piping)

The supply pipe 14 led from the sulfur removal facility 13 is connected to a sulfurization treatment plant and configured to supply the sulfurization treatment plant with hydrogen sulfide gas from which sulfur has been removed. The supply pipe 14 is provided with an ON/OFF valve 27 configured to control the supply of hydrogen sulfide gas to the sulfurization treatment plant. Furthermore, the supply pipe 14 is provided with a pressure gauge 28 configured to measure the pressure of hydrogen sulfide gas supplied to the sulfurization treatment plant, a flowmeter 29 configured to measure the flow rate of hydrogen sulfide gas, and a control valve 30 configured to control the supply of hydrogen sulfide gas.

(Blowdown Facility)

The blowdown facility 15 is configured to recover sulfur removed from hydrogen sulfide gas by the sulfur removal facility 13. Furthermore, the blowdown facility 15 is configured to recover sulfur adhering to the inside of the cooling facilities 12A and 12B. Furthermore, the blowdown facility 15 is configured to supply the recovered sulfur to, for example, a sulfurization treatment plant or the like, using a supply pump 30. Alternatively, the recovered sulfur may be recycled as a source of sulfur to be supplied to the reaction facility 11 again.

Furthermore, the blowdown facility 15 is provided with the outlet 24 to exhaust waste hydrogen sulfide gas to the outside of a system, the waste hydrogen sulfide gas being generated in the cooling facilities 12A and 12B and discharged to the blowdown facility 15. As illustrated in FIG. 1, the outlet 24 of the blowdown facility 15 is connected to the piping 31, and, via the piping 31, the blowdown facility 15 is connected to the treatment plant A which uses hydrogen sulfide gas, and waste hydrogen sulfide gas exhausted from the outlet 24 is supplied to the treatment plant A via the piping 31.

It should be noted that the treatment plant A to which waste hydrogen sulfide gas is supplied is not particularly limited, and a treatment plant which uses hydrogen sulfide gas is beneficial. Examples of the treatment plant A include a plant for the dezincification step and a plant for the sulfurization step which are used in the foregoing hydrometallurgical method of nickel oxide ore. In the treatment plant A, the working pressure of the hydrogen sulfide gas is preferably lower than an operating pressure condition (from 780 to 800 kPaG) in the reaction facility 11 of the plant 10, because waste hydrogen sulfide gas can be more smoothly supplied by pressure difference without the provision of a transport pump or the like.

(Sulfur Cooling Facility)

In order to adjust a heat balance in the reaction facility 11, the sulfur cooling facility 16 is configured to cool sulfur from approximately 470° C. to approximately 150° C. Furthermore, the sulfur cooling facility 16 is configured to supply the cooled sulfur, for example, to the blowdown facility 15 to supply the sulfur to a sulfurization treatment plant or the like, together with sulfur recovered from the cooling facilities 12A and 12B and the sulfur removal facility 13. Furthermore, the sulfur cooling facility 16 may allow the cooled sulfur to be recycled as a sulfur source to be supplied to the reaction facility 11 again by using a circulating pump 32.

(Gas Treatment Facility)

The gas treatment facility 17 is, for example, a detoxifying facility configured to neutralize hydrogen sulfide gas leaking from each of the facilities by using a neutralizer such as caustic soda, thereby rendering the gas harmless; a flare facility configured to burn hydrogen sulfide gas to reduce the toxicity of the gas and render the gas harmless; or the like, and the detoxifying facility which uses a neutralizer is preferable, but, as long as a facility can render the hydrogen sulfide gas harmless, the facility is not particularly limited. The gas treatment facility 17 is connected to the exhaust facilities 18 and the nitrogen gas supply facility 19 mentioned later and configured to render hydrogen sulfide gas sent from these facilities harmless.

(Exhaust Facility)

The exhaust facilities 18 are provided in, for example, the reaction facility 11 configured to generate hydrogen sulfide gas, the cooling facility 12 configured to treat hydrogen sulfide gas, and the sulfur removal facility 13, respectively. It should be noted that the exhaust facilities 18 are not limited to be provided in these respective facilities, but may be provided in other facilities which carry a risk of hydrogen sulfide gas leakage in the plant for manufacturing hydrogen sulfide gas 10.

The exhaust facility 18 has an exhaust pipe 40 configured to exhaust hydrogen sulfide gas to the air. The exhaust pipe 40 is led from the building 23, 25, 26 and connected to the air, and one end of the exhaust pipe 40 branches out into a first exhaust pipe 40a configured to exhaust hydrogen sulfide gas into the air, and a second exhaust pipe 40b connected to the gas treatment facility 17 and configured to exhaust hydrogen sulfide gas to the gas treatment facility 17.

Furthermore, the exhaust facility 18 is provided with: a concentration measuring apparatus 41 arranged between the building 23, 25, 26 and a branch point of the exhaust pipe 40 and configured to measure the concentration of leaking hydrogen sulfide gas; and a valve mechanism 42 configured to control the exhaust from the first exhaust pipe 40a and the second exhaust pipe 40b, based on the result of a measurement by the concentration measuring apparatus 41.

As long as the valve mechanism 42 can control the exhaust from the first exhaust pipe 40a and the second exhaust pipe 40b, the type and arrangement of the valve are not limited. As a type of the valve mechanism 42, for example, an ON/OFF valve can be mentioned, but, the type of the valve mechanism 42 is not limited to this, and a control valve may be employed. Switching of ON/OFF of the valve mechanism 42 enables switching between separation and connection between the inside of the building 23, 25, 26 and the air and between the inside of the building 23, 25, 26 and the gas treatment facility 17. Here, an ON/OFF valve provided in the first exhaust pipe 40a is taken as a first ON/OFF valve 42a, and an ON/OFF valve provided in the second exhaust pipe 40b is taken as a second ON/OFF valve 42b. The first ON/OFF valve 42a and the second ON/OFF valve 42b are normally in an OFF state, that is, in a state in which the first exhaust pipe 40a and the second exhaust pipe 40b are closed.

Furthermore, the exhaust facility 18 may be provided with a fan 43, for example, between the concentration measuring apparatus 41 and the branch point so as to improve the flow of hydrogen sulfide gas. Furthermore, the exhaust facility 18 may be provided with an alarm device so that an alarm sounds depending on the concentration of hydrogen sulfide gas.

In the exhaust facility 18, the concentration of hydrogen sulfide gas leaking to the building 23, 25, 26 is measured using the concentration measuring apparatus 41, and in the case where the result of a measurement by the concentration measuring apparatus 41 is less than a predetermined concentration, the first ON/OFF valve 42a is turned ON and opened to connect the building 23, 25, 26 to the air via the first exhaust pipe 40a, on the other hand, the second ON/OFF valve 42b is turned OFF so as not to connect the building 23, 25, 26 to the gas treatment facility 17 via the second exhaust pipe 40b. Such control allows hydrogen sulfide gas inside the building 23, 25, 26 to be exhausted into the air.

On the contrary, in the case where the result of a measurement by the concentration measuring apparatus 41 is not less than a predetermined concentration, the first ON/OFF valve 42a is turned OFF and closed so as not to connect the building 23, 25, 26 to the air via the first exhaust pipe 40a, on the other hand, the second ON/OFF valve 42b is turned ON so as to connect the building 23, 25, 26 to the gas treatment facility 17 via the second exhaust pipe 40b. Such control allows hydrogen sulfide gas inside the building 23, 25, 26 to be exhausted to the gas treatment facility 17.

Here, the control of the ON/OFF valves 42a and 42b is performed in such a manner that, based on the result of a measurement by the concentration measuring apparatus 41, it is determined whether or not the concentration of hydrogen sulfide gas is low enough to allow hydrogen sulfide gas to be exhausted to the air, whereby the ON or OFF control is performed. Although it is said that hydrogen sulfide gas is highly hazardous, hydrogen sulfide gas of low concentration has no adverse effect on the environment and humans even when exhausted into the air. Generally, a hydrogen sulfide gas concentration of 1 ppm is a concentration for the control of working environment specified by the Industrial Safety and Health Law; a hydrogen sulfide gas concentration of 5 ppm is a tolerance concentration specified by the Japan Society for Occupational Health; and it is said that hydrogen sulfide gas having a concentration of from 50 to 100 ppm causes symptoms, respiratory irritation, conjunctivitis, and the like. That is, it can be said that hydrogen sulfide gas having a concentration of less than 5 ppm has no adverse effect on the environment and humans.

Therefore, in the exhaust facility 18 in the present embodiment, the predetermined concentration of hydrogen sulfide gas is preferably set to 5 ppm. That is, in the exhaust facility 18, it is preferable that, in the case where the concentration of hydrogen sulfide gas which is measured by the concentration measuring apparatus 41 is less than 5 ppm, hydrogen sulfide gas is exhausted from the first exhaust pipe 40a into the air, on the contrary, in the case where the concentration is not less than 5 ppm, the valve mechanism 42 is controlled so that hydrogen sulfide gas is exhausted from the second exhaust pipe 40b to the gas treatment facility 17 to render the hydrogen sulfide gas harmless by the gas treatment facility 17. It should be noted that an alarm may be allowed to sound when the concentration of hydrogen sulfide gas reaches 1 ppm.

In the exhaust facility 18 having the foregoing configuration, the concentration of leaking hydrogen sulfide gas is measured by the concentration measuring apparatus 41, and, for example, in the case where the concentration is less than 5 ppm, hydrogen sulfide gas is exhausted to the air. This eliminates the need to operate the gas treatment facility 17 all the time in the plant for manufacturing hydrogen sulfide gas 10, and accordingly, for example, in a detoxifying facility, hydrogen sulfide gas does not always have to be neutralized and rendered harmless, and therefore, the amount of a neutralizer used can be reduced, whereby cost reduction can be achieved.

It should be noted that, in the exhaust facility 18, the installation position of the valve mechanism 42 is not limited to be in each of the first exhaust pipe 40a and the second exhaust pipe 40b, and one valve which opens one of the first exhaust pipe 40a and the second exhaust pipe 40b and closes the other may be provided at the branch point.

(Nitrogen Gas Supply Facility)

To avoid the explosion limit in the reactor 20 and the quench tower 21 of the reaction facility 11 which requires severer operating conditions among the facilities of the plant for manufacturing hydrogen sulfide gas 10, the nitrogen gas supply facility 19 lets nitrogen gas always flow into portions from which hydrogen sulfide gas easily leaks, such as a flange portions in the reactor 20 and the quench tower 21. In the plant for manufacturing hydrogen sulfide gas 10, nitrogen gas is always supplied to the flange portions and the like, whereby leaking hydrogen sulfide gas is removed from the reaction facility by nitrogen gas, and accordingly, the explosion limit can be avoided. Furthermore, in the plant for manufacturing hydrogen sulfide gas 10, at the time of a predetermined periodic inspection, trouble occurrence, or plant start-up, a treatment is performed in such a manner that the plant for manufacturing hydrogen sulfide gas 10 and a treatment plant are separated, and then, the atmosphere inside the plant for manufacturing hydrogen sulfide gas 10 is substituted for nitrogen gas or the like. Therefore, in such treatment, the nitrogen gas supply facility 19 supplies nitrogen gas to the inside of the plant 10. It should be noted that, in FIG. 1, the nitrogen gas supply facility 19 which supplies nitrogen gas to the flange portions and the like of the reactor 20 and the quench tower 21 is illustrated, and the nitrogen gas supply facility at the time of a periodic inspection or the like is omitted.

In the nitrogen gas supply facility 19, nitrogen gas is supplied and forced to pass from the outsides of the reactor 20 and the quench tower 21 to portions, such as the flange portions, from which hydrogen sulfide gas easily leaks. Thus, nitrogen gas passes through the flange portions and the like, whereby hydrogen sulfide gas is forced out from the flange portions and the like, together with nitrogen gas.

The hydrogen sulfide gas forced out together with nitrogen gas is normally neutralized or burned in the gas treatment facility 17 to be rendered harmless. However, in the present embodiment, as is the case with the foregoing exhaust facility 18, based on the concentration of hydrogen sulfide gas, it is determined whether the hydrogen sulfide gas is exhausted into the air or exhausted to the gas treatment facility 17, whereby operation of the gas treatment facility 17 can be reduced.

Specifically, the nitrogen gas supply facility 19 has a mixed gas exhaust pipe 45 configured to exhaust nitrogen gas supplied to the reactor 20 and the quench tower 21 via the supply pipe 44 and hydrogen sulfide gas removed from the flange portions and the like. One end of this mixed gas exhaust pipe 45 branches out into a first mixed gas exhaust pipe 45a configured to exhaust nitrogen gas and hydrogen sulfide gas to the air, and a second mixed gas exhaust pipe 45b configured to exhaust nitrogen gas and hydrogen sulfide gas to the gas treatment facility 17.

Furthermore, the nitrogen gas supply facility 19 is provided with a concentration measuring apparatus 46 arranged between the reactor 20 and the quench tower 21 and a branch point of the mixed gas exhaust pipe 45 and configured to measure the concentration of removed hydrogen sulfide gas; and a valve mechanism 47 configured to control the exhaust from the first mixed gas exhaust pipe 45a and the second mixed gas exhaust pipe 45b, based on the result of a measurement by the concentration measuring apparatus 46.

As long as the valve mechanism 47 can control the exhaust from the first mixed gas exhaust pipe 45a and the second mixed gas exhaust pipe 45b, the type and arrangement of the valve are not limited. As a type of the valve mechanism 47, for example, an ON/OFF valve can be mentioned, but, the type of the valve mechanism 47 is not limited to this, and a control valve may be employed. Switching of ON/OFF of the valve mechanism 47 enables switching between separation and connection between the reactor 20 and the quench tower 21 and the air and between the reactor 20 and the quench tower 21 and the gas treatment facility 17. Here, an ON/OFF valve provided in the first mixed gas exhaust pipe 45a is taken as a first ON/OFF valve 47a, and an ON/OFF valve provided in the second mixed gas exhaust pipe 45b is taken as a second ON/OFF valve 47b. The first ON/OFF valve 47a and the second ON/OFF valve 47b are normally in an OFF state, that is, in a state in which the first mixed gas exhaust pipe 45a and the second mixed gas exhaust pipe 45b are closed.

Furthermore, the nitrogen gas supply facility 19 may be provided with, for example, a fan 48 between the concentration measuring apparatus 46 and the branch point so as to improve the flow of nitrogen gas and hydrogen sulfide gas.

In the nitrogen gas supply facility 19, the concentration of removed hydrogen sulfide gas is measured by the concentration measuring apparatus 46, and in the case where the result of a measurement by the concentration measuring apparatus 46 is less than a predetermined concentration, the first ON/OFF valve 47a is turned ON and opened to connect the reactor 20 and the quench tower 21 to the air via the first mixed gas exhaust pipe 45a, on the other hand, the second ON/OFF valve 47b is turned OFF so as not to connect the reactor 20 and the quench tower 21 to the gas treatment facility 17 via the second mixed gas exhaust pipe 47b. Such control allows nitrogen gas and hydrogen sulfide gas inside the reactor 20 and the quench tower 21 to be exhausted into the air.

On the contrary, in the case where the result of a measurement by the concentration measuring apparatus 46 is not less than a predetermined concentration, the first ON/OFF valve 47a is turned OFF and closed so as not to connect the reactor 20 and the quench tower 21 to the air via the first mixed gas exhaust pipe 45a, on the other hand, the second ON/OFF valve 47b is turned ON and opened so as to connect the reactor 20 and the quench tower 21 to the gas treatment facility 17 via the second mixed gas exhaust pipe 45b. Such control allows nitrogen gas and hydrogen sulfide gas to be exhausted to the gas treatment facility 17.

Here, the control of the ON/OFF valves is performed in the same manner as in the foregoing exhaust facility 18, that is, based on the result of a measurement by the concentration measuring apparatus 46, it is determined whether or not the concentration of hydrogen sulfide gas is low enough to allow the hydrogen sulfide gas to be exhausted to the air, whereby the ON or OFF control is performed. In the nitrogen gas supply facility 19, as is the case with the foregoing exhaust facility 18, it is preferable that, in the case where the concentration of hydrogen sulfide gas which is measured by the concentration measuring apparatus 46 is less than 5 ppm, the hydrogen sulfide gas is exhausted from the first mixed gas exhaust pipe 45a into the air, on the other hand, in the case where the concentration of hydrogen sulfide gas is not less than 5 ppm, the valve mechanism 47 is controlled so that the hydrogen sulfide gas is exhausted from the second mixed gas exhaust pipe 45b to the gas treatment facility 17 to render the hydrogen sulfide gas harmless in the gas treatment facility 17.

It should be noted that, in the nitrogen gas supply facility 19, the installation position of the valve mechanism 47 is not limited to be in each of the first mixed gas exhaust pipe 45a and the second mixed gas exhaust pipe 45b, and one valve which opens one of the first mixed gas exhaust pipe 45a and the second mixed gas exhaust pipe 45b and closes the other may be provided at the branch point.

In the nitrogen gas supply facility 19 having the foregoing configuration, the concentration of leaking hydrogen sulfide gas is measured by the concentration measuring apparatus 46, and, for example, in the case where the concentration is less than 5 ppm, the hydrogen sulfide gas is exhausted to the air. This eliminates the need to operate the gas treatment facility 17 all the time in the plant for manufacturing hydrogen sulfide gas 10, and accordingly, for example, in a detoxifying facility, hydrogen sulfide gas does not always have to be neutralized and rendered harmless, and therefore, the amount of a neutralizer used can be reduced, whereby cost reduction can be achieved.

In the plant for manufacturing hydrogen sulfide gas 10 having the foregoing configuration, hydrogen sulfide gas generated in the reaction facility 11 is cooled in the cooling facility 12, and sulfur mixed in is removed in the sulfur removal facility 13, whereby hydrogen sulfide gas is produced. The produced hydrogen sulfide gas is transported from the supply pipe 14 to a sulfurization treatment plant which uses hydrogen sulfide gas.

Furthermore, in the hydrogen sulfide gas plant 10, waste hydrogen sulfide gas generated in the cooling facility 12 is recovered and supplied to a treatment plant A such as a plant for a sulfurization step, and therefore, waste hydrogen sulfide gas, which has ever been only exhausted and been a loss, can be efficiently recovered and effectively used in the treatment plant A. Unlike the conventional practice, a treatment for waste hydrogen sulfide gas by a flare facility, a gas treatment facility, or the like is not required, and therefore, the cost of use of a recovery solvent such as caustic soda can be made unnecessary, and accordingly operational costs can be considerably reduced.

In the plant for manufacturing hydrogen sulfide gas 10 which is operated as described above, in the case where hydrogen sulfide gas leaks inside the building 23, 25, 26 of the reaction facility 11 or the like, not all of the leaking hydrogen sulfide gas is exhausted to the gas treatment facility 17, but, some of the gas is exhausted to the air if the concentration of the hydrogen sulfide gas has a small impact on humans and the environment and is low enough to allow hydrogen sulfide gas to be exhausted to the air, whereby the operation of the gas treatment facility 17 can be reduced. Thus, in the plant for manufacturing hydrogen sulfide gas 10, for example, the amount of a neutralizer used can be reduced, whereby cost reduction can be achieved.

[3. Method for Exhausting Hydrogen Sulfide Gas]

Next, a specific exhaust method in the plant for manufacturing hydrogen sulfide gas 10 will be described. It should be noted that the exhaust facilities 18 provided in the respective facilities are configured to independently operate in accordance with the respective concentrations of leaking hydrogen sulfide gas.

Figure 2:
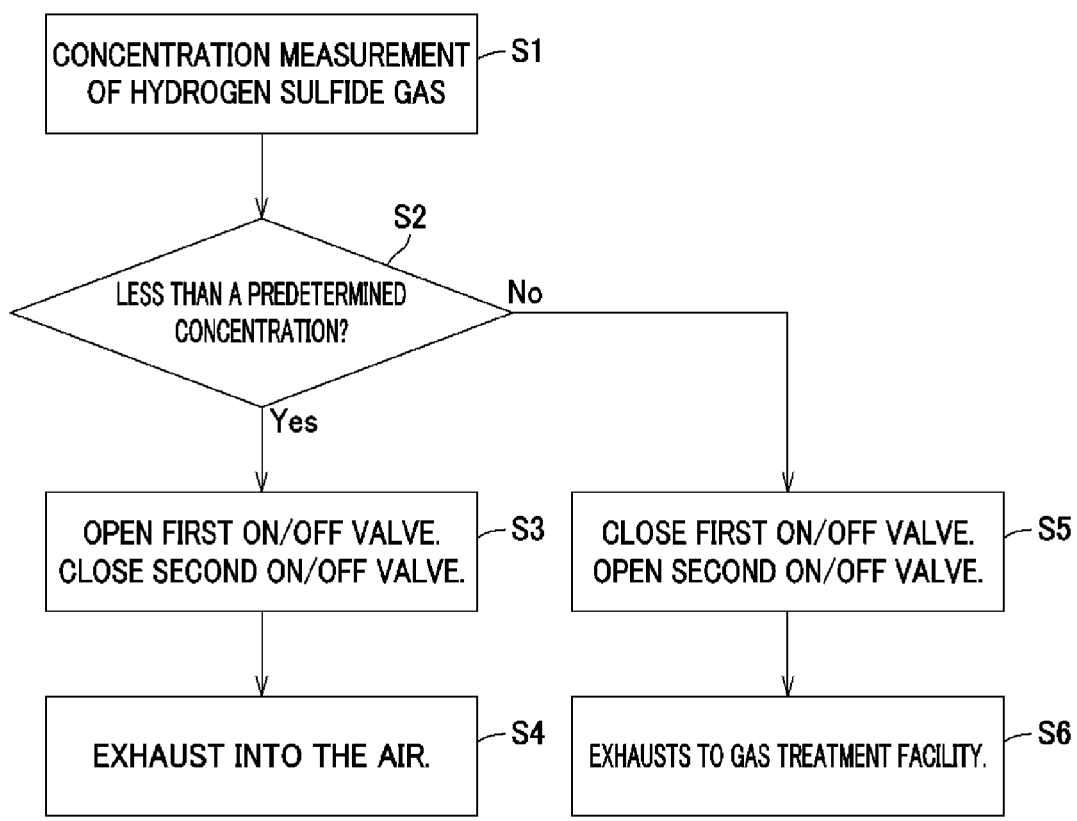
FIG. 2 illustrates a flow chart of an exhaust method in the above-mentioned plant.
Figure 3:
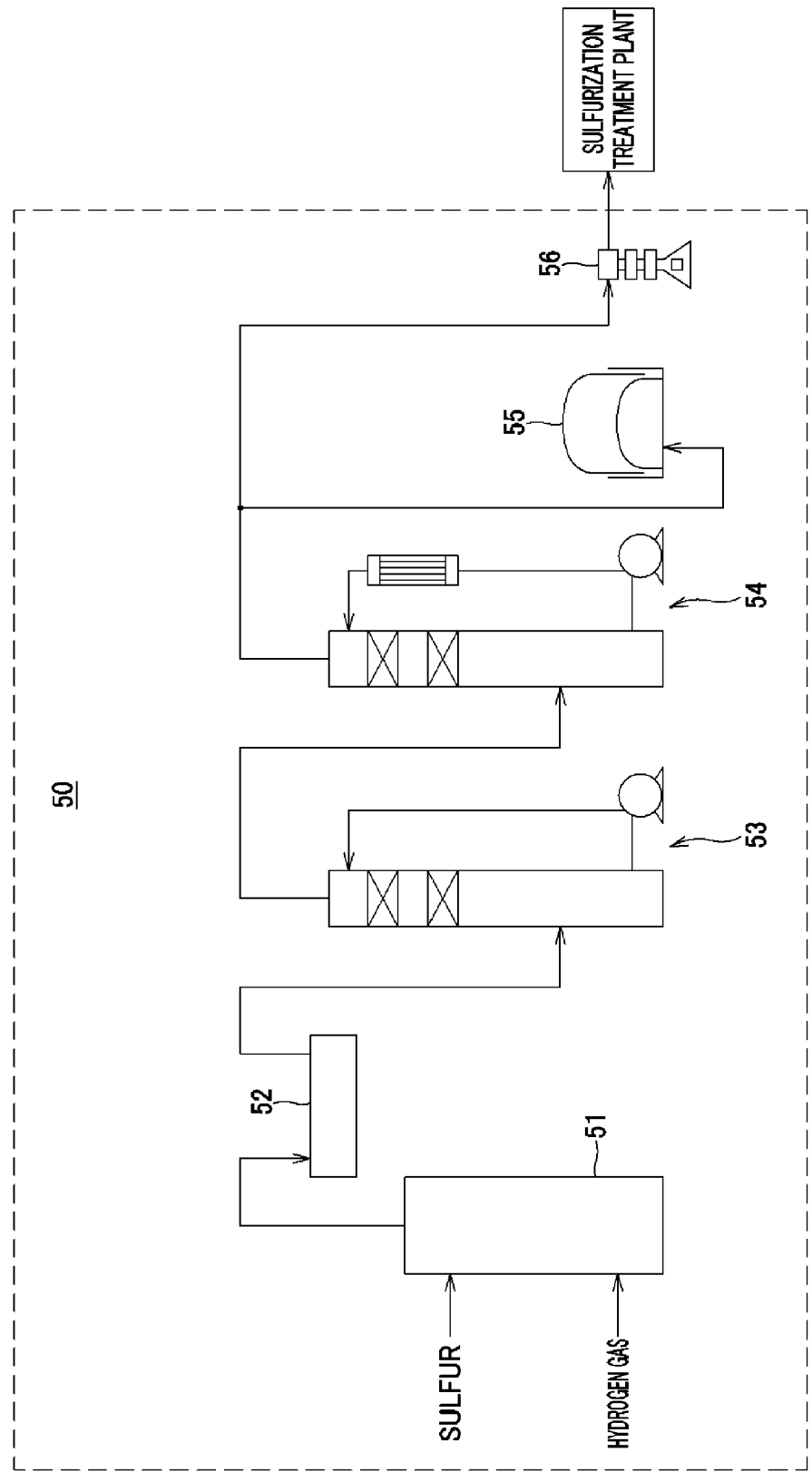
FIG. 3 is a schematic diagram illustrating the configuration of a conventional plant for manufacturing hydrogen sulfide gas.
Figure 4:
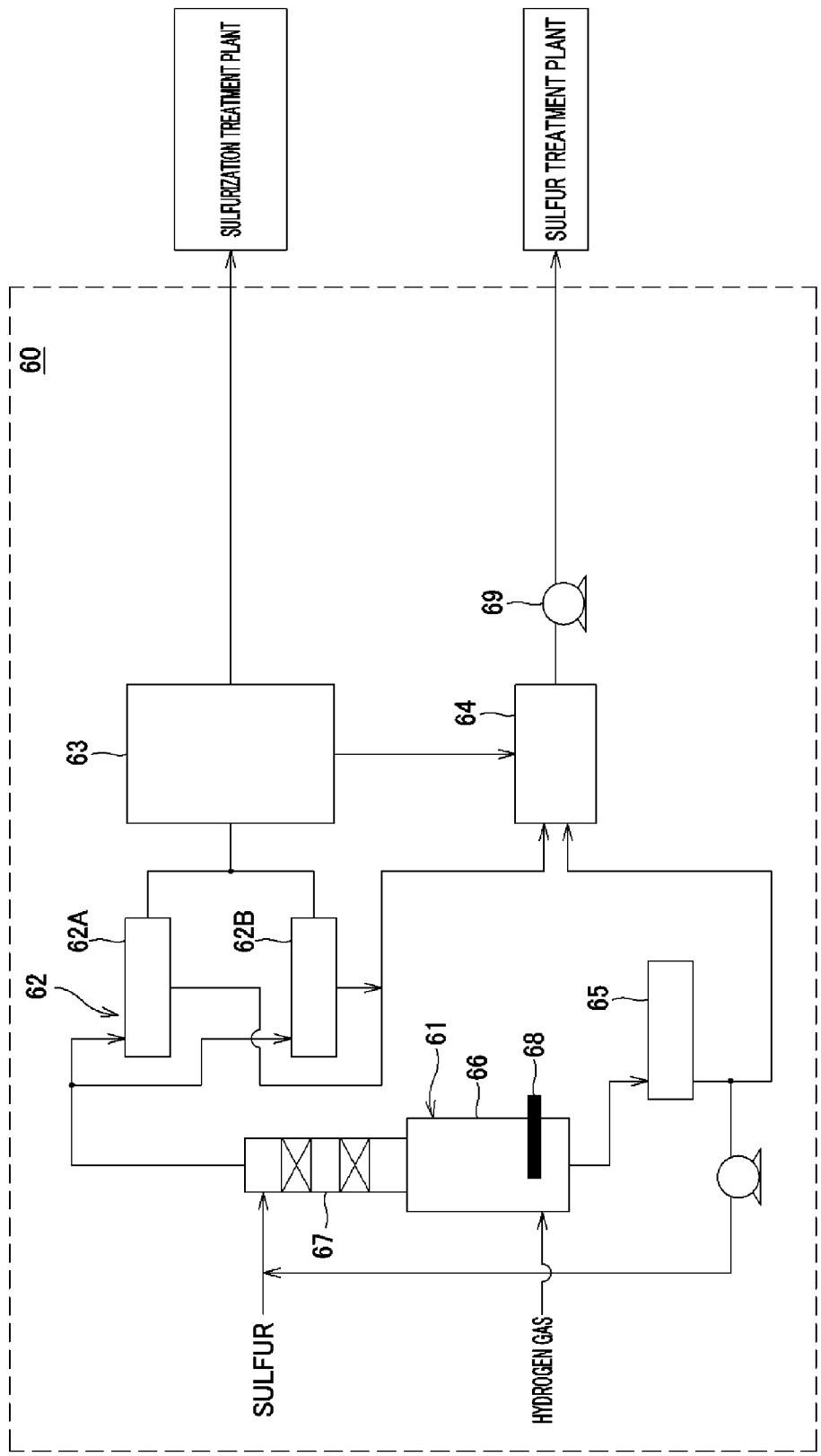
FIG. 4 is a schematic diagram illustrating the configuration of another conventional plant for manufacturing hydrogen sulfide gas.

First, as illustrated in FIG. 2, in Step 1, the concentrations of hydrogen sulfide gas leaking inside the buildings 23, 25, 26 of the reaction facility 11, the cooling facility 12, and the sulfur removal facility 13, respectively are measured by the respective concentration measuring apparatuses 41.

Next, in Step 2, it is determined whether or not the results of measurements by the concentration measuring apparatuses 41 are less than a predetermined concentration. The predetermined concentration is a concentration having no adverse effect on the environment and humans even when leaking hydrogen sulfide gas is exhausted to the air. As mentioned above, a concentration of 5 ppm is a tolerance concentration specified by the Japan Society for Occupational Health, and it is said that hydrogen sulfide gas having a concentration of from 50 to 100 ppm causes symptoms, respiratory irritation, conjunctivitis, and the like, and hence, the predetermined concentration is preferably set to, for example, 5 ppm.

Next, in Step 2, if the concentration of hydrogen sulfide gas is less than the predetermined concentration (Yes), the operation proceeds to Step 3. In Step 3, the first ON/OFF valve 42a provided in the first exhaust pipe 40a is opened, and the second ON/OFF valve 42b provided in the second exhaust pipe 40b is closed.

Then, in Step 4, since the first ON/OFF valve 42a is opened and the second ON/OFF valve 42b is closed in Step 3, the building 23, 25, 26 is connected to the air via the first exhaust pipe 40a, on the other hand, the building 23, 25, 26 is kept separated from the gas treatment facility 17, whereby a pressure difference is caused to allow hydrogen sulfide gas inside the building 23, 25, 26 to be exhausted into the air.

On the other hand, in Step 2, if the concentration of hydrogen sulfide gas is not less than the predetermined concentration (No), the operation proceeds to Step 5. In Step 5, the first ON/OFF valve 42a provided in the first exhaust pipe 40a is closed, and the second ON/OFF valve 42b provided in the second exhaust pipe 40b is opened.

Then, in Step 6, since the first ON/OFF valve 42a is closed and the second ON/OFF valve 42b is opened in Step 5, the building 23, 25, 26 is connected to the gas treatment facility 17 via the second exhaust pipe 40b, on the other hand, the building 23, 25, 26 is kept separated from the air, whereby a pressure difference is caused to allow hydrogen sulfide gas inside the building 23, 25, 26 to be exhausted to the gas treatment facility 17.

As described above, in the plant for manufacturing hydrogen sulfide gas 10, when the concentration of hydrogen sulfide gas leaking inside the building 23, 25, 26 is less than the predetermined concentration, the hydrogen sulfide gas is exhausted into the air, whereby a treatment in the gas treatment facility 17 can be reduced, and, while safety in exhausting hydrogen sulfide gas is maintained, costs can be reduced.

Furthermore, also in the case where the nitrogen gas supply facility 19 is provided in the plant for manufacturing hydrogen sulfide gas 10, hydrogen sulfide gas is exhausted likewise. It should be noted that an exhaust method in the nitrogen gas supply facility 19 is the same as that in the foregoing exhaust facility 18, and therefore, the method will be described by using FIG. 2.

In Step 1, the concentration of hydrogen sulfide gas leaking to the flange portions and the like of the reactor 20 and the quench tower 21 is measured by the concentration measuring apparatus 46 provided in the piping 45.

Next, in Step 2, it is determined whether or not the result of the measurement by the concentration measuring apparatus 46 is less than a predetermined concentration. The predetermined concentration is the same as that in the case of the exhaust facility 18, and therefore, a description of the predetermined concentration will be omitted.

Next, in Step 2, if the concentration of hydrogen sulfide gas is less than the predetermined concentration (Yes), the operation proceeds to Step 3. In Step 3, the first ON/OFF valve 47a provided in the first mixed gas exhaust pipe 45a is opened, and the second ON/OFF valve 47b provided in the second mixed gas exhaust pipe 45b is closed.

Then, in Step 4, since the first ON/OFF valve 47a is opened and the second ON/OFF valve 47b is closed in Step 3, the reactor 20 and the quench tower 21 are connected to the air via the first mixed gas exhaust pipe 45a, on the other hand, the reactor 20 and the quench tower 21 are kept separated from the gas treatment facility 17, whereby a pressure difference is caused to allow hydrogen sulfide gas inside the reactor 20 and the quench tower 21 to be exhausted into the air.

On the other hand, in Step 2, if the concentration of hydrogen sulfide gas is not less than the predetermined concentration (No), the operation proceeds to Step 5. In Step 5, the first ON/OFF valve 47a provided in the first mixed gas exhaust pipe 45a is closed, and the second ON/OFF valve 47b provided in the second mixed gas exhaust pipe 45b is opened.

Then, in Step 6, since the first ON/OFF valve 47a is closed and the second ON/OFF valve 47b is opened in Step 5, the reactor 20 and the quench tower 21 are connected to the gas treatment facility 17 via the second mixed gas exhaust pipe 45b, on the other hand, the reactor 20 and the quench tower 21 are kept separated from the air, whereby a pressure difference is caused to allow hydrogen sulfide gas inside the reactor 20 and the quench tower 21 to be exhausted to the gas treatment facility 17.

As described above, in the plant for manufacturing hydrogen sulfide gas 10, even in the case where hydrogen sulfide gas is removed together with nitrogen gas supplied to the reactor 20 and the quench tower 21, hydrogen sulfide gas is exhausted to the air in accordance with the concentration of the hydrogen sulfide gas, whereby a treatment in the gas treatment facility 17 can be reduced, and, while safety in exhausting hydrogen sulfide gas is maintained, costs can be reduced.

As mentioned above, in the plant for manufacturing hydrogen sulfide gas 10, in the gas treatment facility 17, for example, a neutralization treatment does not always have to be applied to hydrogen sulfide gas in a detoxifying facility, and therefore, the amount of a neutralizer used can be reduced. This allows costs to be reduced in the plant for manufacturing hydrogen sulfide gas 10, while safety in exhausting hydrogen sulfide gas is maintained. Furthermore, in the case where a flare facility is used for the gas treatment facility 17, hydrogen sulfide gas does not always have to be burned to reduce toxicity, and therefore, the generation of SOx can be reduced.

Furthermore, in the plant for manufacturing hydrogen sulfide gas 10, not all the hydrogen sulfide gas which is removed together with nitrogen gas in the nitrogen gas supply facility 19 is exhausted to the gas treatment facility 17, and, as is the case with the exhaust facility 18, only in the case where a neutralization treatment is required, the hydrogen sulfide gas is exhausted to the gas treatment facility 17, or, if allowed, the gas is exhausted into the air, whereby a neutralization treatment in the gas treatment facility 17 can be reduced. Therefore, in the plant for manufacturing hydrogen sulfide gas 10, even in the case where the nitrogen gas supply facility 19 is provided, operation of the gas treatment facility 17 can be reduced, and, while safety in exhausting hydrogen sulfide gas is maintained, particularly costs can be reduced, and the generation of SOx can be reduced.

Another Embodiment

In FIG. 1, there is illustrated the plant for manufacturing hydrogen sulfide gas 10 including the reaction facility 11, the cooling facility 12, the sulfur removal facility 13, the gas treatment facility 17, the exhaust facilities 18, and the nitrogen gas supply facility 19, but, the present invention is not limited to this, may include a plurality of the plants for manufacturing hydrogen sulfide gas 10. In the case where the present invention includes a plurality of the plants, the plants 10 are connected to each other, and therefore, even when an inspection or a trouble occurs in one of the plants 10, other plants 10 are operated to maintain manufacturing of hydrogen sulfide gas. Furthermore, even in the case of the plurality of the plants as mentioned above, operation of the gas treatment facility can be controlled by the exhaust facility and the nitrogen gas supply facility in each of the plants, as is the case with the foregoing plant for manufacturing hydrogen sulfide gas.

REFERENCE SYMBOLS

10 . . . plant for manufacturing hydrogen sulfide gas, 11 . . . reaction facility, 12 . . . cooling facility, 13 . . . sulfur removal facility, 14 . . . supply pipe, 15 . . . blowdown facility, 16 . . . sulfur cooling facility, 17 . . . gas treatment facility, 18 . . . exhaust facility, 19 . . . nitrogen gas supply facility, 40 . . . exhaust pipe, 41 . . . concentration measuring apparatus, 42 . . . valve mechanism, 42a . . . first ON/OFF valve, 43 . . . fan, 44 . . . supply pipe, 45 . . . exhaust pipe, 46 . . . concentration measuring apparatus, 47 . . . valve mechanism, 47a . . . first ON/OFF valve, 47b . . . second ON/OFF valve, and 48 . . . fan.

The invention claimed is:

1. A plant for manufacturing hydrogen sulfide gas, the plant comprising at least: a reaction facility configured to generate hydrogen sulfide gas from sulfur and hydrogen gas; a cooling facility configured to cool generated hydrogen sulfide gas; a sulfur removal facility configured to remove sulfur contained in the hydrogen sulfide gas; and a gas treatment facility configured to render the hydrogen sulfide gas harmless,
wherein the plant has exhaust facilities which are provided in the reaction facility, the cooling facility, and the sulfur removal facility, respectively, and configured to exhaust hydrogen sulfide gas leaking from the facilities, and
wherein each of the exhaust facilities comprises:
an exhaust pipe whose one end branches out into a first exhaust pipe configured to exhaust leaking hydrogen sulfide gas to the air and a second exhaust pipe configured to exhaust leaking hydrogen sulfide gas to the gas treatment facility;
a concentration measuring apparatus provided between the corresponding facility and a branch point in the exhaust pipe and configured to measure a concentration of the hydrogen sulfide gas; and
a valve mechanism configured to perform control in such a manner that, when the concentration measuring apparatus detects a concentration less than a predetermined concentration, the hydrogen sulfide gas is exhausted from the first exhaust pipe to the air, and when the concentration measuring apparatus detects a concentration not less than a predetermined concentration, the hydrogen sulfide gas is exhausted from the second exhaust pipe to the gas treatment facility.

2. The plant for manufacturing hydrogen sulfide gas according to claim 1, wherein the valve mechanism comprises: a first valve provided in the first exhaust pipe and configured to control the exhaust to the air via the first exhaust pipe; and a second valve provided in the second exhaust pipe and configured to control the exhaust to the gas treatment facility via the second exhaust pipe.

3. The plant for manufacturing hydrogen sulfide gas according to claim 1, wherein the exhaust pipe is provided with a fan between the concentration measuring apparatus and the branch point.

4. The plant for manufacturing hydrogen sulfide gas according to claim 1, further comprising a nitrogen gas supply facility configured to supply nitrogen gas at least to the reaction facility and remove leaking hydrogen sulfide gas from the reaction facility,
wherein the nitrogen gas supply facility comprises:
a mixed gas exhaust pipe whose one end branches out into a first mixed gas exhaust pipe configured to exhaust the leaking hydrogen sulfide gas together with the nitrogen gas to the air and a second mixed gas exhaust pipe configured to exhaust the leaking hydrogen sulfide gas together with the nitrogen gas to the gas treatment facility;
a concentration measuring apparatus provided between the reaction facility and a branch point in the mixed gas exhaust pipe and configured to measure a concentration of the hydrogen sulfide gas; and
a valve mechanism configured to perform control in such a manner that, when the concentration measuring apparatus detects a concentration less than a predetermined concentration, the nitrogen gas and the hydrogen sulfide gas are exhausted from the first mixed gas exhaust pipe into the air, and when the concentration measuring apparatus detects a concentration not less than a predetermined concentration, the nitrogen gas and the hydrogen sulfide gas are exhausted from the second mixed gas exhaust pipe to the gas treatment facility.

5. The plant for manufacturing hydrogen sulfide gas according to claim 4, wherein the valve mechanism of the nitrogen gas supply facility comprises: a first valve provided in the first mixed gas exhaust pipe and configured to control the exhaust to the air via the first mixed gas exhaust pipe; and a second valve provided in the second mixed gas exhaust pipe and configured to control the exhaust to the gas treatment facility via the second mixed gas exhaust pipe.

6. The plant for manufacturing hydrogen sulfide gas according to claim 4, wherein the mixed gas exhaust pipe is provided with a fan between the concentration measuring apparatus and the branch point.

7. The plant for manufacturing hydrogen sulfide gas according to claim 1, wherein the predetermined concentration of the hydrogen sulfide gas is 5 ppm.

8. A method for exhausting hydrogen sulfide gas in a plant for manufacturing hydrogen sulfide gas, the plant comprising at least: a reaction facility configured to generate hydrogen sulfide gas from sulfur and hydrogen gas; a cooling facility configured to cool generated hydrogen sulfide gas; a sulfur removal facility configured to remove sulfur contained in the hydrogen sulfide gas; and a gas treatment facility configured to render the hydrogen sulfide gas harmless,
wherein the plant for manufacturing hydrogen sulfide gas has exhaust facilities which are provided in the reaction facility, the cooling facility, and the sulfur removal facility, respectively, and configured to exhaust hydrogen sulfide gas leaking from the facilities,
wherein each of the exhaust facilities comprises: an exhaust pipe whose one end branches out into a first exhaust pipe configured to exhaust the leaking hydrogen sulfide gas to the air and a second exhaust pipe configured to exhaust the leaking hydrogen sulfide gas to the gas treatment facility; a concentration measuring apparatus provided between the corresponding facility and a branch point in the exhaust pipe and configured to measure a concentration of the hydrogen sulfide gas; and a valve mechanism configured to perform control in such a manner that, when the concentration measuring apparatus detects a concentration less than a predetermined concentration, the hydrogen sulfide gas is exhausted from the first exhaust pipe into the air, and when the concentration measuring apparatus detects a concentration not less than a predetermined concentration, the hydrogen sulfide gas is exhausted from the second exhaust pipe to the gas treatment facility, and comprising, based on a concentration detected by the concentration measuring apparatus, controlling the valve mechanism to exhaust the hydrogen sulfide gas from the first exhaust pipe into the air, or to exhaust the hydrogen sulfide gas from the second exhaust pipe to the gas treatment facility.

9. The method for exhausting hydrogen sulfide gas according to claim 8, wherein the valve mechanism comprises: a first valve provided in the first exhaust pipe and configured to control the exhaust to the air via the first exhaust pipe; and a second valve provided in the second exhaust pipe and configured to control the exhaust to the gas treatment facility via the second exhaust pipe, wherein, when the concentration measuring apparatus detects a concentration less than a predetermined concentration, the first valve provided in the first exhaust pipe is opened and the second valve is closed, whereby the hydrogen sulfide gas is exhausted into the air, wherein, when the concentration measuring apparatus detects a concentration not less than a predetermined concentration, the second valve is opened and the first valve is closed, whereby the hydrogen sulfide gas is exhausted to the gas treatment facility.

10. The method for exhausting hydrogen sulfide gas according to claim 8, wherein the plant for manufacturing hydrogen sulfide gas further comprises a nitrogen gas supply facility configured to supply nitrogen gas at least to the reaction facility and remove leaking hydrogen sulfide gas from the reaction facility, wherein the nitrogen gas supply facility comprises: a mixed gas exhaust pipe whose one end branches out into a first mixed gas exhaust pipe configured to exhaust the leaking hydrogen sulfide gas together with the nitrogen gas to the air and a second mixed gas exhaust pipe configured to exhaust the leaking hydrogen sulfide gas together with the nitrogen gas to the gas treatment facility; a concentration measuring apparatus provided between the reaction facility and a branch point in the mixed gas exhaust pipe and configured to measure a concentration of the hydrogen sulfide gas; and a valve mechanism configured to perform control in such a manner that, when the concentration measuring apparatus detects a concentration less than a predetermined concentration, the nitrogen gas and the hydrogen sulfide gas are exhausted from the first mixed gas exhaust pipe into the air, and when the concentration measuring apparatus detects a concentration not less than a predetermined concentration, the nitrogen gas and the hydrogen sulfide gas are exhausted from the second mixed gas exhaust pipe to the gas treatment facility, and wherein, based on a concentration detected by the concentration measuring apparatus, the valve mechanism is controlled to exhaust the nitrogen gas and the hydrogen sulfide gas into the air or to exhaust the nitrogen gas and the hydrogen sulfide gas to the gas treatment facility.

11. The method for exhausting hydrogen sulfide gas according to claim 10, wherein the valve mechanism of the nitrogen gas supply facility comprises: a first valve provided in the first mixed gas exhaust pipe and configured to control the exhaust to the air via the first mixed gas exhaust pipe; and a second valve provided in the second mixed gas exhaust pipe and configured to control the exhaust to the gas treatment facility via the second mixed gas exhaust pipe, wherein, when the concentration measuring apparatus detects a concentration less than a predetermined concentration, the first valve provided in the first mixed gas exhaust pipe is opened and the second valve provided in the second mixed gas exhaust pipe is closed, whereby the nitrogen gas and the hydrogen sulfide gas are exhausted into the air, wherein, when the concentration measuring apparatus detects a concentration not less than a predetermined concentration, the second valve provided in the second mixed gas exhaust pipe is opened and the first valve in the first mixed gas exhaust pipe is closed, whereby the nitrogen gas and the hydrogen sulfide gas are exhausted to the gas treatment facility.

12. The method for exhausting hydrogen sulfide gas according to claim 8, wherein the predetermined concentration of the hydrogen sulfide gas is 5 ppm.

\* \* \* \* \*